United States Patent [19]
Rothe et al.

[11] Patent Number: 5,250,878
[45] Date of Patent: Oct. 5, 1993

[54] CRT BEAM INTENSITY CORRECTION SYSTEM

[75] Inventors: Rick Rothe, Littleton; Kerry L. Shaklee, Brighton, both of Colo.

[73] Assignee: Alliant Techsystems, Inc., Littleton, Colo.

[21] Appl. No.: 957,699

[22] Filed: Oct. 7, 1992

[51] Int. Cl.$^5$ .................. G09G 1/04; H01J 29/52; H04N 5/84
[52] U.S. Cl. ................... 315/383; 315/384; 358/244
[58] Field of Search ........... 315/383, 384, 386, 367; 358/168, 244

[56] References Cited
U.S. PATENT DOCUMENTS

| | | | |
|---|---|---|---|
| 4,314,179 | 2/1982 | Tooyama et al. | 315/12 |
| 4,450,386 | 5/1984 | Lehnert | 315/384 |
| 4,670,778 | 6/1987 | Miyakawa | 358/75 |
| 4,754,334 | 6/1988 | Krix et al. | 358/244 |
| 5,068,647 | 11/1991 | Hinton et al. | 315/386 |

Primary Examiner—Gregory C. Issing
Attorney, Agent, or Firm—James R. Young

[57] ABSTRACT

Disclosed is a color printer which uses a CRT to print on photographic medium. The printer contains a uniformity EEPROM that corrects for brightness of each position on the CRT. If a position cannot be corrected, a blank code is placed in the EEPROM at the position, to blank the CRT at the position. Adjacent positions are intensified, or positions in the same column on other CRT rows are intensified to correct for the defective position. The printer also allows the uniformity information to be field updated by printing an entire page of each primary color, sending these pages back to the factory, scanning them into a computer system using a document scanner, analyzing each page, creating new uniformity data from the analysis, and sending this data back to the printer where it is loaded into the uniformity EEPROM.

4 Claims, 6 Drawing Sheets

CRT BEAM INTENSITY CORRECTION SYSTEM

CROSS REFERENCE TO RELATED APPLICATIONS

This application is related to U.S. Pat. No. 5,084,656 issued to Sturm, et al. Jan. 28, 1992, entitled "CRT Beam Deflection Control System".

1. Field of the Invention

This invention relates to printers for computer systems and more particularly to Cathode Ray Tube (CRT) display systems within such printers. Even more particularly, the invention relates to controlling the beam deflection within a CRT display system of such a printer.

2. Background of the Invention

Variable speed photographic process printers that utilize CRT's for media exposure typically use linear deflection amplifiers to sweep the electron beam across the face of the CRT. A deflection cycle normally consists of a sweep, retrace, and hold period. During the sweep period, the CRT is unblanked and the beam is driven horizontally at a given vertical position while being modulated to expose the media. During the retrace period, the CRT is blanked and the beam is returned to a home position to wait for the start of the next sweep. Thus, the sweep and retrace periods are typically fixed time intervals. The beam is then held in the home position for the hold period until a new sweep is initiated. Therefore, the hold period is a variable time interval dependent on the print speed.

Occasionally the phosphor coating applied to a CRT will have defects, which cause unevenness in the brightness. Prior art systems, such as U.S. Pat. No. 4,670,778 issued Jun. 2, 1987 to Miyakawa, corrects for defects by measuring the brightness of each position on the CRT, and storing a correction factor in a table for each position. When a position is addressed during display, the correction factor is retrieved from the table and applied to the electron beam to correct the unevenness. These systems are limited, however, in the amount they can correct. If a position has a defect that exceeds the range of the correction factor, such as a position that has no brightness, these systems are unable to correct for the position.

Also, the prior art systems must have the correction table established when the device using the CRT is manufactured, since the correction table is typically stored in read only memory.

It is thus apparent that there is a need in the art for an improved system that corrects for intensity variation in the phosphor coating of a CRT. There is another need in the art for such a system that corrects for the total absence of light from a particular phosphor position. There is a further need in the art for a system that allows field update of the correction data. The present invention meets these and other needs.

This application is related to U.S. Pat. No. 5,084,656 issued to Sturm, et al. Jan. 28, 1992, entitled "CRT Beam Deflection Control System", which is specifically incorporated herein by reference for all that is disclosed and taught therein.

SUMMARY OF THE INVENTION

It is an aspect of the present invention to correct the intensity of each position illuminated by an electron beam within a cathode ray tube (CRT) of a photographic type printer.

It is another aspect of the invention to correct for positions by modifying the intensity of adjacent positions in the same row.

It is another aspect of the invention to correct for positions by modifying the intensity of adjacent positions in the same vertical column.

Another aspect of the invention is to place correction information in an electrically programmable read only memory to allow changes in the correction information.

A further aspect of the invention is to provide a method of field updating the correction information.

The above and other aspects of the invention are accomplished in a system having a memory mapped deflection including a vertical register and a horizontal deflection controller to control the position of an electron beam within a CRT used to project a color image onto a photographic medium for printing. When data is being displayed on the CRT, the beam is positioned vertically to the desired color phosphor row and then swept across the face of the CRT while the data is used to modulate the beam.

The system contains a uniformity EEPROM that adjusts brightness for each position on the CRT. Thus each position is corrected for the amount of light it can output. If a position on the CRT is so defective that it cannot be corrected by the uniformity EEPROM, a blank code is placed in the EEPROM at the position, and the CRT is blanked when the beam scans this position. Compensation is made for this position by intensifying adjacent positions, and by intensifying positions in the same column on other CRT rows, after advancing the media to those rows.

The system also allows the uniformity information to be field updated. To perform a field update, an entire page of each primary color is printed. These pages are sent back to the factory where they are scanned into a computer system using a document scanner. The computer system evaluates the pages, and creates new uniformity data which is sent, using removable media or modems, to the printer where the EEPROM is updated.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
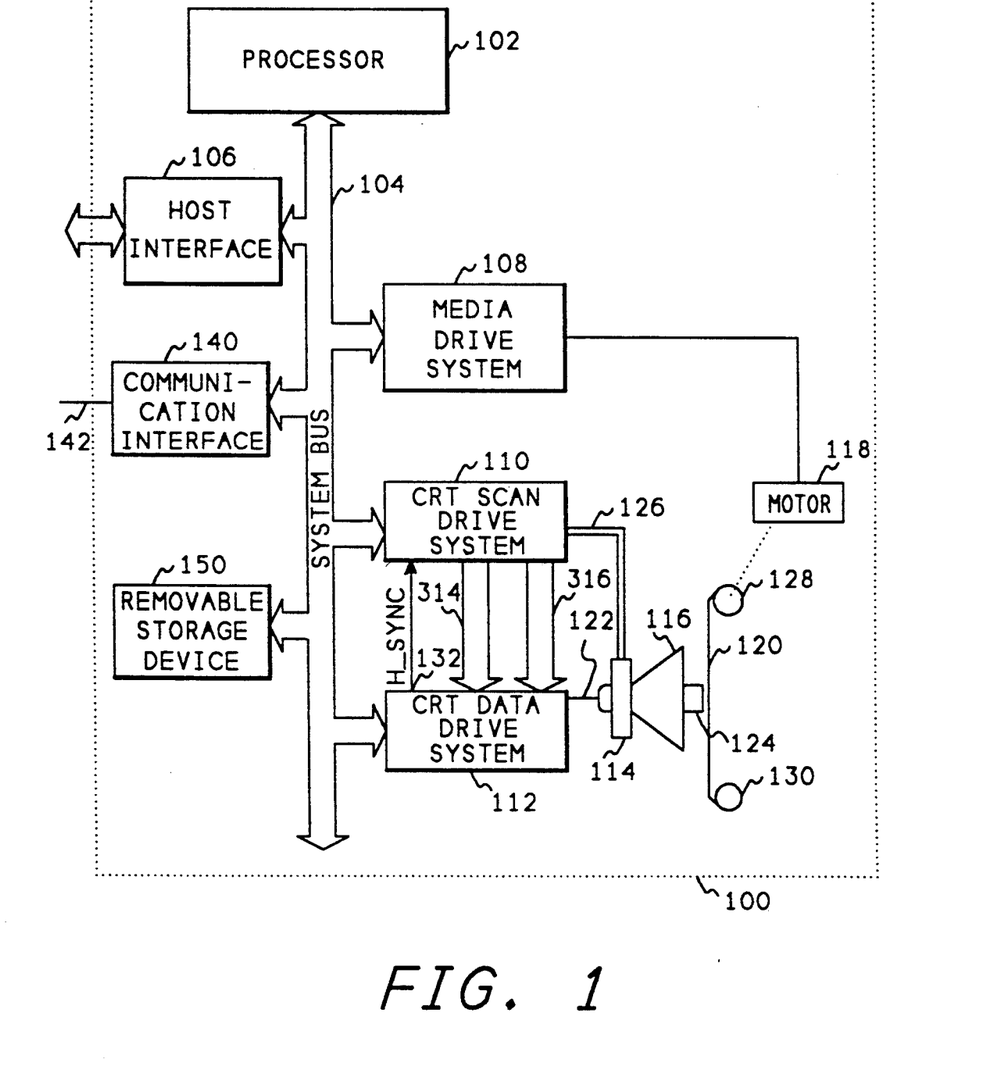
FIG. 1 shows a block diagram of a printer incorporating the present invention.

FIG. 1 shows a block diagram of a printer incorporating the present invention. Referring now to FIG. 1, a printer 100 contains a control digital processing unit 102 which communicates to other components of the system over a system bus 104. The processing unit 102 uses a host interface 106 to receive data from a host system (not shown), and the processing unit 102 stores this data in a CRT data drive system 112. The output 122 of the CRT data drive system 112 is connected to a CRT 116 and used to modulate the electron beam within the CRT 116. Data displayed on the face of the CRT 116 is conducted through a CRT fiber optic faceplate 124 to print media 120. The print media 120 is a photosensitive media capable of recording the image displayed on the CRT and conducted through the CRT fiber optic faceplate 124. Deflection of the electron beam of the CRT 116 is controlled by a CRT scan drive system 110 whose output 126 is connected to a yoke 114 of the CRT 116. The CRT data drive system 112 controls the start of each horizontal trace through an H_SYNC signal 132, and receives beam position information over a vertical address bus 314 and a horizontal address bus 316. The present invention is incorporated within the CRT scan drive system 110.

The print media 120 is moved by a paper roll 128 which is powered by a motor 118. The motor 118 is operated by a paper drive system 108 which is controlled over the system bus 104 by the processing unit 102.

A communications interface 140 can be used to input EEPROM data into the printer, and removable storage device 150 can also be used to load EEPROM data. EEPROM data can also be received over the host interface 106.

Operation of the system begins when data is received over the host interface 106. The processing unit 102 takes the data from the host interface 106 and stores the data in the CRT drive system 112. The CRT drive system 112 converts the data to a series of dot rows of the appropriate color to produce the appropriate image desired. The paper drive system 108 is then used to move the media 120 in front of each of red, green, or blue phosphor stripe on the face of the fiber optic faceplate 124. The CRT scan drive system 110 is then activated to scan the electron beam across the appropriate phosphor stripe while the CRT data drive system 112 modulates the CRT beam intensity to expose the print media. The print media is then moved a fixed distance, and the process is repeated for one of the other colors. One row of data is complete after all three phosphors—red, green, and blue—have been scanned.

Figure 2:
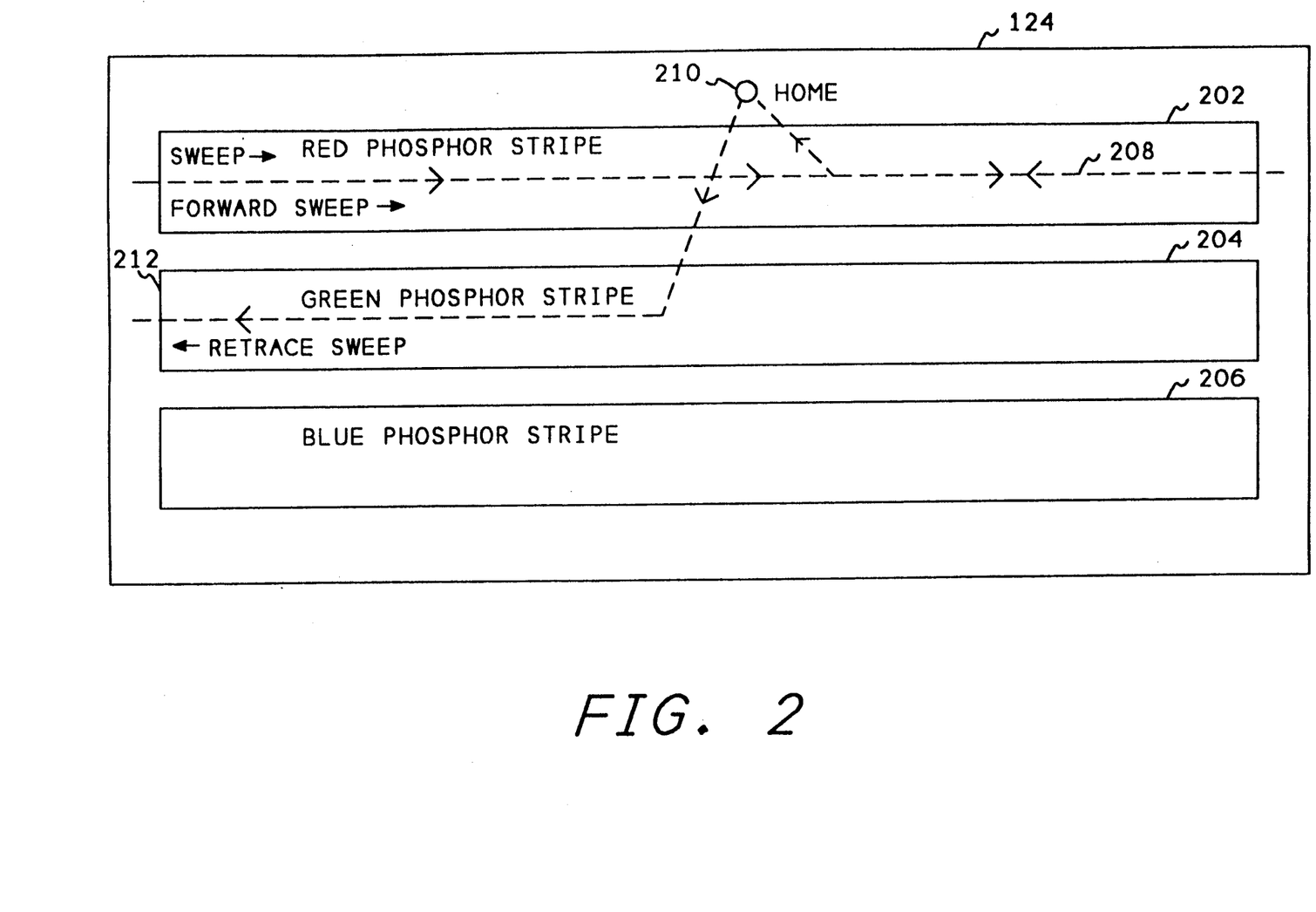
FIG. 2 shows a diagram of the face of the CRT used with the present invention.

FIG. 2 shows a diagram of the face of the fiber optic faceplate 124, and illustrates the three phosphor stripes as well as the home position of the present invention. Referring now to FIG. 2, the CRT fiber optic faceplate 124 contains a red phosphor stripe 202, a green phosphor stripe 204, and a blue phosphor stripe 206. A dotted line 208 shows the sweep and retrace lines for the electron beam across the face of the CRT 116 (FIG. 1) and the fiber optic faceplate 124. During retrace of the CRT beam 208, the beam is directed to a home position 210 which is located above the three phosphor stripes, and the beam remains in this position until the next phosphor stripe is to be scanned. The aspects of the present invention are accomplished by keeping the CRT beam in this home position during idle periods. That is, while the CRT beam is in the home position 210, exposure leak will not occur because the CRT beam is kept outside the phosphor stripes on the CRT fiber optic faceplate, thus the beam is incapable of exposing the media. By placing the CRT beam at the home position 210 above the red phosphor stripe 202, even if leakage occurs, no light will be conducted through the fiber optic faceplate 124 to the media. Also, since the electron beam is in the center of the CRT, power dissipation within the horizontal amplifiers is significantly reduced, thus minimizing thermal dissipation requirements of the deflection amplifiers. When a new dot row is to be scanned, the beam moves from the home position 210 to the left side 212 to begin the next sweep. Since the next sweep is always immediately preceded by the completion of the retrace, the initial conditions for a sweep are consistent, thus eliminating dynamic errors.

Figure 3:
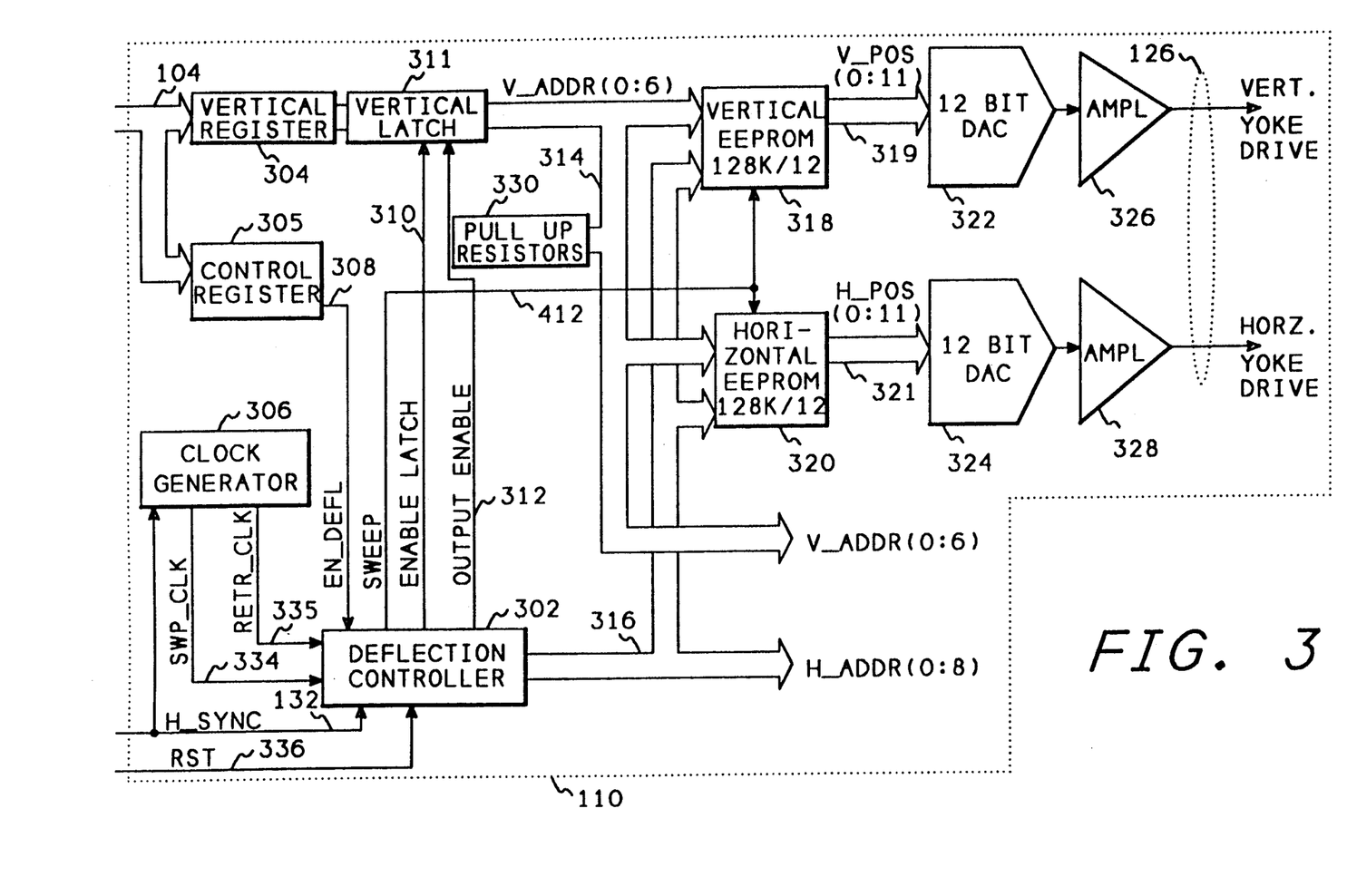
FIG. 3 shows a block diagram of the CRT scan drive system of FIG. 1.

FIG. 3 shows a block diagram of the CRT scan drive system 110 (FIG. 1) incorporating the present invention. Referring now to FIG. 3, the CRT scan drive system 110 contains a deflection controller 302 which creates the data necessary to cause a sweep and retrace of the CRT beam, and to place the CRT beam into the home position 210 (FIG. 2). A vertical register 304 receives a vertical address from the CPU over the system bus 104. The vertical address is used to select either a red, green, or blue phosphor stripe on the face of the CRT 116 (FIG. 1). The vertical address is transferred to vertical latch 311 by an enable latch signal 310. The output V_ADDR 314 of the vertical latch 311 is a seven bit bus that is connected to a vertical EEPROM 318. V_ADDR 314 also connects to a horizontal EEPROM 320. The output of the deflection controller 302 is an nine bit H_ADDR bus 316 which is also connected to the vertical EEPROM 318 and the horizontal EEPROM 320. The deflection controller 302 also outputs a SWEEP signal 412 which indicates whether the beam is scanning in a forward direction or performing a retrace. SWEEP signal 412 is a logic 1 when the beam is sweeping forward across the CRT, and is logic 0 otherwise.

Data on the V_ADDR bus 314 and the H_ADDR bus 316 are converted by the vertical EEPROM 318 into a twelve bit vertical position signal V_POS 319 which is connected to a twelve bit D to A converter 322. The output of the D to A converter is amplified by an amplifier 326 and connected through signal 126 to the vertical yoke drive on the CRT 116. Data on the V_ADDR bus 314 and the H_ADDR bus 316 are also connected to the horizontal EEPROM 320. The horizontal EEPROM 320 converts these two values into a twelve bit horizontal position value H_POS 321 which is connected to a horizontal position twelve bit D to A converter 324. The output of the horizontal position D to A converter 324 is amplified by amplifier 328 and connected through signal 126 to the horizontal drive yoke. The vertical drive yoke signal and the horizontal drive yoke signal comprise the output 126 of the CRT scan drive system 110 (FIG. 1).

Figure 4:
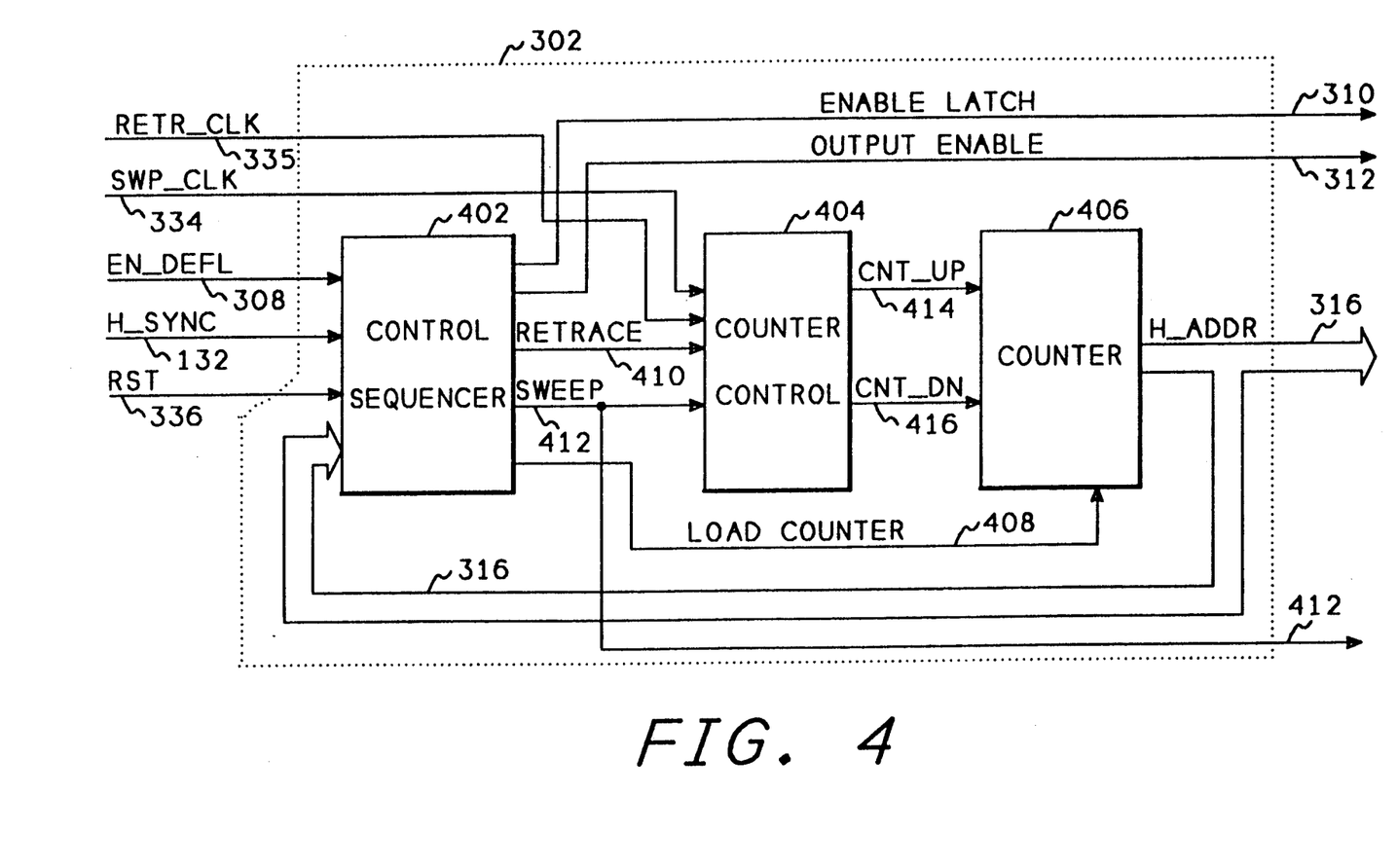
FIG. 4 shows a block diagram of the deflection controller of FIG. 3.

FIG. 4 shows a block diagram of the deflection controller 302 of FIG. 3. Referring now to FIG. 4, the deflection controller 302 contains a control sequencer 402 which controls all the functions within the deflection controller 302. The control sequencer 402 sends a RETRACE signal 410 and SWEEP signal 412 to a counter control circuit 404. The counter control circuit 404 controls the up or down counting of a counter 406 through a pair of signals CNT_UP 414 and CNT_DN 416. A LOAD COUNTER signal 408 is sent from the control sequencer 402 to the counter 406 to cause it to load a preset value. The output of the counter 406 is the nine bit H_ADDR bus 316 which was described above with respect to FIG. 3. The H_ADDR bus 316 also connects to the control sequencer 402 so that the control sequencer 402 can determine the count value in the counter 406. The operation of the control sequencer, counter control and counter are described in U.S. Pat. No. 5,084,656, described above.

Figure 5:
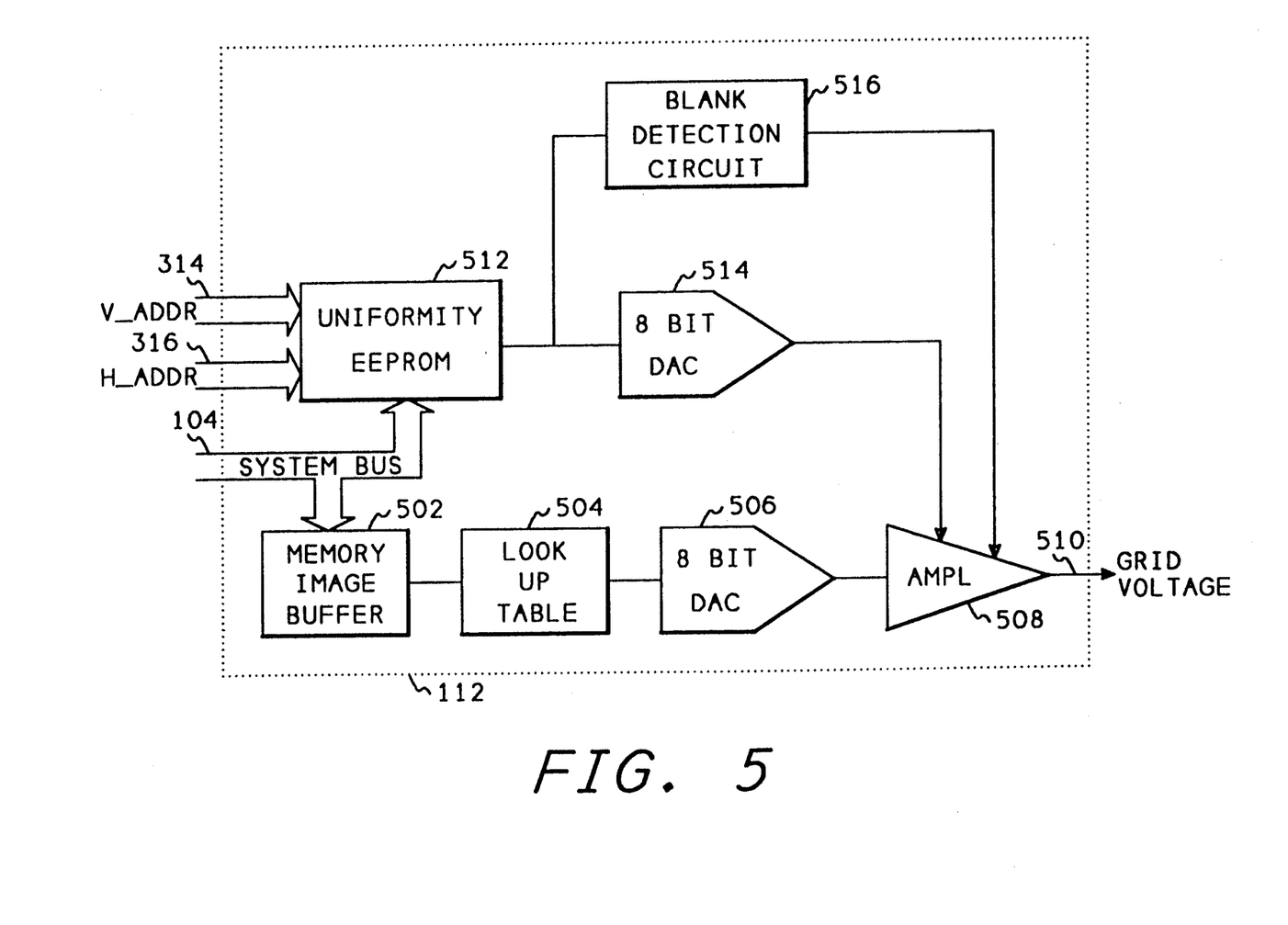
FIG. 5 shows a block diagram of the CRT drive system of FIG. 1.

FIG. 5 shows a block diagram of the CRT drive system 112 of FIG. 1. Referring now to FIG. 5, the CRT drive system 112 is shown containing a memory image buffer 502. Data being displayed is first sent to the memory image buffer 502 through the system bus 104 (also shown in FIG. 1). When a phosphor row is being exposed by the CRT, data from the memory image buffer is retrieved and sent to a look up table 504 which translates the data for each position on the row into a number representative of the display intensity needed to expose the media at this position. This number is then converted from a digital value to an analog value by DAC 506, amplified by amplifier 508, and used to drive the grid of the CRT to control the intensity of the displayed position.

Because the phosphor coating on each CRT may vary, the light output of each position is measured for each CRT, and intensity correction information is placed in a uniformity EEPROM 512. Since this information is position dependent and not dependent on the particular data being displayed at a location, only the V_ADDR and H_ADDR signals are needed to address the uniformity EEPROM 512. Output of the uniformity EEPROM 512 is converted to an analog value by a DAC 514 and coupled to amplifier 508 to modify the intensity of the grid voltage 510. Thus as each position is displayed, data for the position is retrieved from the memory image buffer 502 and used to create an initial value for the grid voltage 510, as described above, and the intensity of the grid voltage 510 is then modified by the output of the uniformity EEPROM 512 in order to correct for any phosphor coating variation at the position.

The intensity correction information is unique to each particular CRT, therefore each CRT must be measured and correction information stored in the uniformity EEPROM 512 for the particular CRT. As will be described below, this information may be corrected after shipment of the CRT in a printer.

There are many phosphor rows for each color being displayed. Since the print media is movable, a particular location on the media may be exposed by any one of the phosphor rows. Each location on the media may also be exposed by several rows at different times as the media is moved. With this method, each CRT position exposed would be exposed using a lower intensity, and the cumulative effect is to expose the media location at the total intensity desired.

In practice some CRT positions will have a severe low intensity output, or the phosphor may be contaminated resulting in a color change, or the CRT may have other problems that result in a color change or an uncontrollably high intensity. For positions having these types of problems, the correction range for the uniformity EEPROM is insufficient to correct the position. For these positions, a special blank code is placed in the uniformity EEPROM 512. This blank code is detected by the blank detection circuit 516, which completely blanks the CRT at each of the uncorrectable positions. Complete blanking is necessary since the intensity level of the position is unknown, and therefore would be uncorrectable if allowed to expose the media.

Since a media location is not being exposed by these CRT positions, exposure for the media location must be provided through a correction system. This correction is performed by increasing the intensity of CRT positions in the same column on other rows that expose this position. Correction can also be accomplished by increasing the intensity of adjacent CRT positions in the same row.

Figure 6:
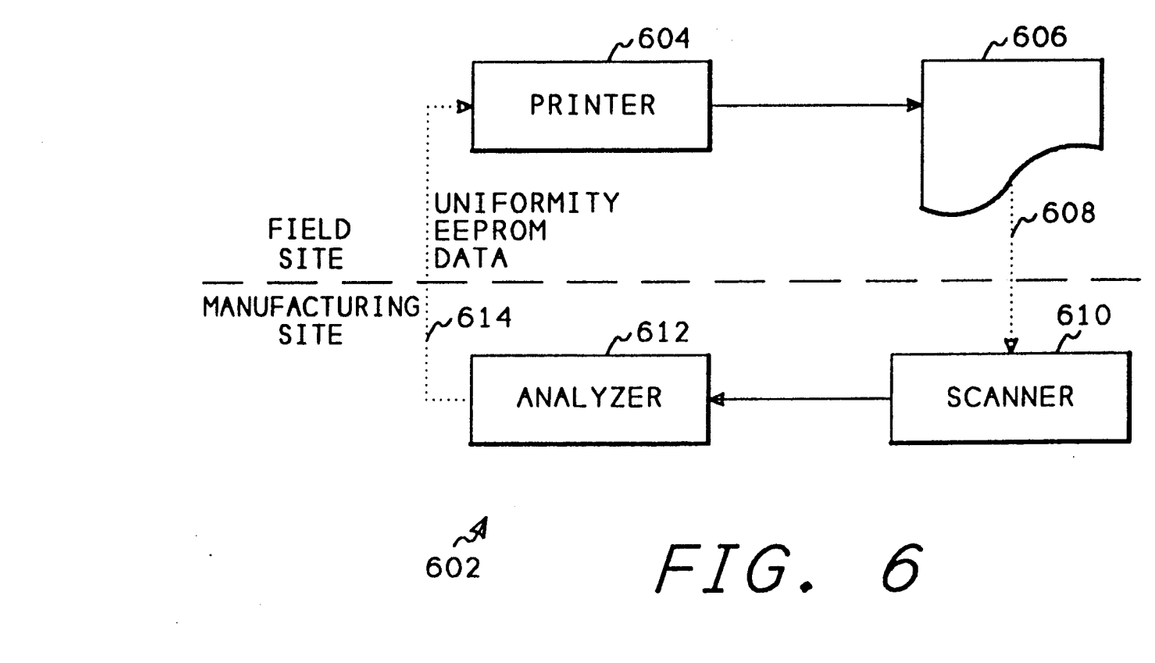
FIG. 6 shows a block diagram of the field update system of the invention.

As discussed above, each individual CRT is measured and correction information unique to the CRT is placed into the EEPROM 512. However, the phosphor coating can be altered by vibration or shock during shipment, or may gradually change intensity output during use over time. To avoid replacing the CRT and EEPROM, field correction can be performed. FIG. 6 shows a block diagram of this correction process. Referring now to FIG. 6, a printer 604 having incorrect exposure, has been installed at a field location, that is, any location away from the manufacturing location. A sheet 606, which consists of a flat field of uniform intensity, is printed for each primary color, and these sheets are sent back to the factory. Once received by the factory, each sheet is scanned by an optical scanner device 610 and the data sent to an analyzer computer system 612. The analyzer computer system 612 analyzes each CRT position from the data on the sheet and creates new uniformity correction information from the scanned data. This information is then sent back to the printer 604 through removable media, such as floppy disks, or over communication lines through a modem, or through the host computer that connects to the printer. The new uniformity information is received by the printer, and then transferred to the uniformity EEPROM 512 over system bus 104.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A CRT intensity correction system having an electron beam for illuminating a phosphor area on the face of the CRT, said system comprising:

deflection controller means for sending a horizontal position address that varies from a left most position on the face of the CRT to a right most position on the face of the CRT and a vertical position address that varies from a top most position on the face of the CRT to a bottom most position on the face of the CRT;

data translation means responsive to said horizontal position address and said vertical position address for modifying an intensity of said electron beam at each position in accordance with data retrieved from a memory image buffer;

uniformity translation means responsive to said horizontal position address and said vertical position address for further modifying said intensity of said electron beam at each position in accordance with a predefined intensity adjustment value, and wherein said uniformity translation means further comprises intensity adjustment values for each position adjacent a position containing a predefined blanking code, wherein said adjacent positions are within a same row of the CRT as said position containing said predefined blanking code; and blanking means responsive to an output of said uniformity translation means for blanking said electron beam when said predefined blanking code is retrieved, from said uniformity translation means, at a position.

2. A CRT intensity correction system having an electron beam for illuminating a phosphor area on the face of the CRT, said system comprising:

deflection controller means for sending a horizontal position address that varies from a left most position on the face of the CRT to a right most position on the face of the CRT and a vertical position address that varies from a top most position on the face of the CRT to a bottom most position on the face of the CRT;

data translation means responsive to said horizontal position address and said vertical position address for modifying an intensity of said electron beam at each position in accordance with data retrieved from a memory image buffer;

uniformity translation means responsive to said horizontal position address and said vertical position address for further modifying said intensity of said electron beam at each position in accordance with a predefined intensity adjustment value, and wherein said uniformity translation means further comprises intensity adjustment values in each position adjacent a position containing a predefined blanking code, wherein said adjacent positions are within a same column of the CRT as said position containing said predefined blanking code; and blanking means responsive to an output of said uniformity translation means for blanking said electron beam when said predefined blanking code is retrieved, from said uniformity translation means, at a position.

3. A CRT intensity correction system having an electron beam for illuminating a phosphor area on the face of the CRT, said system comprising:

deflection controller means for sending a horizontal position address that varies from a left most position on the face of the CRT to a right most position on the face of the CRT and a vertical position address that varies from a top most position on the face of the CRT to a bottom most position on the face of the CRT;

data translation means responsive to said horizontal position address and said vertical position address for modifying an intensity of said electron beam at each position in accordance with data retrieved from a memory image buffer;

uniformity translation means responsive to said horizontal position address and said vertical position address for further modifying said intensity of said electron beam at each position in accordance with a predefined intensity adjustment value, and wherein said uniformity translation means further comprises intensity adjustment values in each of a plurality of positions adjacent a position containing a predefined blanking code, wherein each of said plurality of adjacent positions are within a same column of the CRT as said position containing said predefined blanking code; and blanking means responsive to an output of said uniformity translation means for blanking said electron beam when said predefined blanking code is retrieved, from said uniformity translation means, at a position.

4. A CRT intensity correction system having an electron beam for illuminating a phosphor area on the face of the CRT, said system comprising:

deflection controller means for sending a horizontal position address that varies from a left most position on the face of the CRT to a right most position on the face of the CRT and a vertical position address that varies from a top most position on the face of the CRT to a bottom most position on the face of the CRT;

data translation means responsive to said horizontal position address and said vertical position address for modifying an intensity of said electron beam at each position in accordance with data retrieved from a memory image buffer;

uniformity translation means responsive to said horizontal position address and said vertical position address for further modifying said intensity of said electron beam at each position in accordance with a predefined intensity adjustment value, and wherein said uniformity translation means further comprises intensity adjustment values in each of a plurality of positions adjacent a position containing a predefined blanking code, wherein each of said plurality of adjacent positions have a common column address or a common row address of the CRT as said position containing said predefined blanking code; and blanking means responsive to an output of said uniformity translation means for blanking said electron beam when said predefined blanking code is retrieved, from said uniformity translation means, at a position.

* * * * *